(12) United States Patent
Audibert-Hayet et al.

(10) Patent No.: US 7,226,896 B2
(45) Date of Patent: *Jun. 5, 2007

(54) ORGANIC EMULSION-BREAKING FORMULA AND ITS USE IN TREATING WELL BORES DRILLED IN OIL-BASE MUD

(75) Inventors: Annie Audibert-Hayet, Croissy sur Seine (FR); Claire Giard-Blanchard, Paris (FR); Christine Dalmazzone, Versailles (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 863 days.

This patent is subject to a terminal disclaimer.

(21) Appl. No.: 09/989,199

(22) Filed: Nov. 21, 2001

(65) Prior Publication Data
US 2002/0098997 A1 Jul. 25, 2002

(30) Foreign Application Priority Data
Nov. 24, 2000 (FR) .................................. 00 15198

(51) Int. Cl.
*C09K 8/52* (2006.01)
*C09K 8/60* (2006.01)
(52) U.S. Cl. .................. 507/267; 507/131; 507/133; 507/103; 507/138; 507/241; 507/244; 507/265; 507/921; 516/171; 516/185; 516/186; 516/176; 516/161
(58) Field of Classification Search ............. 516/176, 516/161, 171, 185, 186; 507/131, 133, 241, 507/138, 265, 921, 103, 267
See application file for complete search history.

(56) References Cited

U.S. PATENT DOCUMENTS

| | | | |
|---|---|---|---|
| 2,008,419 A | * | 7/1935 | Herman ................. 252/8.57 |
| 2,167,347 A | | 7/1939 | De Groote |
| 2,167,349 A | | 7/1939 | De Groote |
| 2,290,414 A | | 7/1942 | De Groote |
| 2,505,374 A | | 4/1950 | Wirtel |

(Continued)

FOREIGN PATENT DOCUMENTS

DE 197 08 499 9/1998

(Continued)

OTHER PUBLICATIONS

Patent Abstract of Japan, Publication No. 63264690, Publication Date Apr. 21, 1987; Applicant: Sanyo Chem Ind Ltd., Inventor: Noda Kimihiko; Title: Chemical For Crude Oil Recovery And Crude Oil Recovery Method.

*Primary Examiner*—Philip C. Tucker
(74) *Attorney, Agent, or Firm*—Millen, White, Zelano & Branigan, P.C.

(57) ABSTRACT

An organic based emulsion-breaking formulation for use in treating well bores drilled in oil-bearing mud that is not eco-toxic and is optimally compatible with formation fluids comprises:
  as the emulsion-breaking agent, at least one constituent selected from non-ionic amphiphilic compositions obtained by reacting at least one polymerized vegetable oil with at least one aminoalcohol and alkyl esters (for example C1 to C8) of fatty acids derived from natural, vegetable or animal oils;
  optionally, at least one wetting agent selected from anionic surfactants;
  and optionally at least one solvent;
the assembly being as a mixture in an organic base.

Such a formulation can be weighted by mineral fillers.

20 Claims, 7 Drawing Sheets

U.S. PATENT DOCUMENTS

| | | | | |
|---|---|---|---|---|
| 2,728,737 | A * | 12/1955 | Wittcoff | 544/107 |
| 2,805,201 | A * | 9/1957 | Fischer | 507/244 |
| 4,140,640 | A | 2/1979 | Scherubel | |
| 4,481,121 | A * | 11/1984 | Barthel | 507/138 |
| 4,738,795 | A * | 4/1988 | Farnand | 516/161 |
| 4,964,615 | A * | 10/1990 | Mueller et al. | 507/243 |
| 5,888,492 | A * | 3/1999 | Starch | 424/78.03 |
| 5,958,844 | A * | 9/1999 | Sinquin et al. | 507/90 |
| 6,022,833 | A * | 2/2000 | Mueller et al. | 507/203 |
| 6,218,342 | B1 * | 4/2001 | Patel | 507/129 |
| 6,221,920 | B1 * | 4/2001 | Hillion et al. | 516/15 |
| 6,339,048 | B1 * | 1/2002 | Santhanam et al. | 507/131 |
| 6,476,081 | B1 * | 11/2002 | Hillion et al. | 516/15 |
| 6,476,492 | B2 * | 11/2002 | Iwasaki et al. | 257/758 |
| 6,479,432 | B1 * | 11/2002 | Sixl | 504/103 |
| 6,492,430 | B1 * | 12/2002 | Hillion et al. | 516/15 |
| 6,662,871 | B2 * | 12/2003 | Kercheville et al. | 166/255.1 |
| 6,750,180 | B1 * | 6/2004 | Argillier et al. | 507/131 |
| 2004/0038829 | A1 * | 2/2004 | Thaemlitz | 507/100 |
| 2004/0110642 | A1 * | 6/2004 | Thompson et al. | 507/100 |

FOREIGN PATENT DOCUMENTS

| | | |
|---|---|---|
| EP | 0 492 857 | 7/1992 |
| EP | 1 053 781 | 5/1999 |
| FR | 2 768 637 | 9/1997 |
| FR | 2 768 732 | 9/1997 |
| GB | 839112 | 6/1960 |
| WO | 97/12947 | 4/1997 |
| WO | 99/66006 | 12/1999 |

* cited by examiner

ORGANIC EMULSION-BREAKING FORMULA AND ITS USE IN TREATING WELL BORES DRILLED IN OIL-BASE MUD

BACKGROUND OF THE INVENTION

1. Field of the Invention

The invention relates to treating well bores drilled in oil-base mud. More particularly, it relates to an emulsion-breaking formulation for use in treating well bores drilled in oil-base mud, preferably non-ecotoxic and optimally compatible with formation fluids, which comprises at least one constituent selected from non-ionic amphiphilic compositions obtained by reacting at least one vegetable oil polymerized with at least one aminoalcohol and alkyl esters (for example C1 to C8) of fatty acids derived from natural, vegetable or animal oils; optionally, at least one wetting agent selected from anionic surfactants; and optionally, at least one solvent (or diluent); said emulsion-breaking formulation being used in an organic base to limit phenomena of emulsion formation in situ and re-saturation of the well edges with an aqueous phase. The invention also concerns formulations of the same type weighted with mineral fillers.

An oil-base formation is damaged when a well is shown to be less productive than well analysis tests predict. The mechanisms of formation damage depend on the type of reactions produced between the well fluid, and the formation and rock fluids under operating conditions (pressure and temperature of the zone and the mud). An alteration in the producing formation close to the well is due to deleterious interactions between the formation fluids and the foreign fluids introduced. If the well fluids are shown to be responsible for the damage, a chemical treatment is necessary to restore the characteristics of the reservoir. It has to cause the destruction of the external and/or internal cake and clean the damaged zone at the well edges. Such a treatment may or may not be combined with an acidic matrix treatment.

As a general rule, oil-base well fluids generate little filtrate, have good rheological properties and form a thin, permeable cake. In contrast, they contain chemical additives (surfactants) charged with emulsifying the water into the form of droplets in the continuous oil-base phase and with making the solid particles used as a weighting agent or viscosifying agent wettable by the oil. Such surfactants, in a large excess of concentration in the fluid to maintain the stability of the reverse emulsion, can penetrate into the formation with the filtrate.

In particular, three types of damage can be envisaged with oil-base fluids:

the formation of an emulsion in the reservoir, resulting from interactions between the filtrate from the oil-base mud (which principally contains oil and surfactants) and the reservoir fluids (brine and oil). The emulsifying agents introduced in excess into the formulation can come into contact with the formation. Substantial shearing at the constriction caused by the pores in the presence of an emulsifying agent can lead to the formation of a very stable, highly viscous emulsion causing a reduction in the effective mobility of the hydrocarbons present;

an alteration in the initial wettability of the reservoir rock. The emulsifying type products generally transform the initially water-wettable rock into a rock with intermediate wettability, which may even be oil-wettable, which can cause a modification in the oil permeability and thus reduce the mobility of the oil; and deposition of fine mobile particles in the pores (reduction of absolute permeability).

The chemical composition of the filtration cake must be carefully considered when designing treatment fluids. The cake is principally constituted by emulsified water droplets that act as colloidal particles and combine with solid particles in suspension in the fluid to form a cake. The stability of the emulsion, the type and nature of the solids influences both the fluid loss and the cake's filtration properties. The choice of treatment product must take into account the parameters necessary for washing the cake and leaching of the formation.

The envisaged treatment concerns:

dissolving or dispersing the weighting agents present in the cake;

and attack of the additives contained in the filtrate.

Thus, the treatment must be adapted to the type of mud used. The principal parameters to be considered are:

the type of damage and its extent;

the characteristics of the reservoir (porosity and permeability);

the type of formation (nature of rocks and acid solubility);

possible contaminants (water, mud—water-base mud and oil-base mud, cements, bacteria);

the compatibility of the treatment fluid with the contaminants;

the bottom pressure and temperature;

the treatment time; and the physical limitations of the well equipment.

2. Description of the Prior Art

An improvement in the design of a drilling fluid aimed at reducing damage can be completely ruined by using an unsuitable procedure and/or cleaning fluid. The solutions for treating cakes and oil-base mud in current use are in the aqueous form and generate considerable additional damage, and can even block the well. A number of examples of treating well bores using surfactants used in the aqueous phase can be found in the literature (U.S. Pat. Nos. 4,681,165, 4,595,511 4,681,164 and 5,110,487). The use of oil-base surfactants to break emulsions has been reported (U.S. Pat. Nos. 5,614,101, 5,256,305 and 4,416,754), but the aim was not an application to oil field production.

SUMMARY OF THE INVENTION

The present invention provides an emulsion-breaking formulation used in an organic base (preferably in a non-polluting organic base which may be the oil of the mud itself), said emulsion-breaking formulation being capable of breaking a water-in-oil emulsion. The invention also encompasses the use of an emulsion-breaking formulation in an organic base in treating drilled well bores in oil-base mud. The simplification in the treatment solution enables the effects of aqueous phase re-saturation at the edges of the well and the formation of in situ emulsions to be limited. The invention also encompasses formulations weighted with mineral fillers.

DETAILED DESCRIPTION OF THE INVENTION

The emulsion-breaking formulations in an organic base of the invention are characterized in that they comprise at least one constituent (hereinafter termed an "emulsion-breaking agent" or an "emulsion-breaker"), optionally associated with a wetting agent selected from anionic surfactants and at least one solvent (or diluent), the ensemble being as a mixture in an organic base, said emulsion-breaking agent comprising at least one non-ionic amphiphilic compound obtained by reacting at least one polymerized vegetable oil with at least one aminoalcohol and/or at least a mixture of alkyl esters (for example C1 to C8) of fatty acids derived from natural, plant or animal oils.

More particularly in the formulations of the invention, said emulsion-breaking agent is present in a proportion of 0.5% to 100% by weight of pure active matter; said wetting agent is present in a proportion of up to 50% by weight of pure active matter; and said solvent (or diluent) is present in a proportion of up to 99.5% by weight; the ensemble has a pure active matter concentration of 0.01 to 50 g, preferably 0.1 g to 10 g per 100 ml of said organic base.

The emulsion-breaking agent (or emulsion-breaker) can firstly consist of at least one non-ionic amphiphilic composition obtained by reacting at least one polymerized vegetable oil with at least one aminoalcohol. Such compositions have been described in the present Applicant's French patent application FR-B-2 768 732.

When preparing such compositions, any vegetable oil is suitable. Preferably, highly unsaturated oils are used such as linseed oil, safflower oil, grapeseed oil, wood oil, sunflower seed oil and mixtures thereof. Preferably, linseed oil is used. These vegetable oils are used in the polymerized form.

Polymerized vegetable oils (routinely known as "stand oils") are obtained by heat treating the highly unsaturated vegetable oils cited above, under conditions in which there is no oxidation. Linseed oil (preferably refined) is generally used, but it is possible to use safflower oil, grapeseed oil, wood oil, sunflower seed oil and mixtures thereof. After polymerization, the polymerized vegetable oils can have a viscosity at 20° C. in the range 5 to 60 Pa·s. By way of example, heat treatment of a refined linseed oil at a temperature of 290–300° C. produces a product with a viscosity of 10 Pa·s. at 25° C. in 6 to 12 hours.

The aminoalcohols used to prepare the amphiphilic compositions that can form part of the composition of the formulations of the invention are generally amines or polyamines comprising one or more alcohol functions and optionally one or more ether functions.

Examples of amino alcohols that correspond are as follows:

HO—$C_mH_{2m}$—$NH_2$

HO—$C_mH_{2m}$—NH—$C_kH_{(2k+1)}$ (HO—$C_mH_{2m}$—)$_2$—NH (HO—$C_mH_{2m}$—)$_p$—$CH_{(3-p)}$—$NH_2$ where m=2 to 6; k=1 to 6; p=2 or 3.

Particular compounds that can be cited are:

monoethanolamine: OH—$(CH_2)_2$—$NH_2$;
monopropanolamine: OH—$(CH_2)_3$—$NH_2$;
monoisopropanolamine: $CH_3$—CH(OH)—$CH_2$—$NH_2$;
2-amino-1-butanol: $CH_3$—$CH_2$—$CH(NH_2)$—$CH_2$—OH;
1-amino-2-butanol: $CH_3$—$CH_2$—CH(OH)—$CH_2$—$NH_2$;
N-methyl-ethanolamine: $CH_3$—NH—$(CH_2)_2$—OH;
N-butyl-ethanolamine: $CH_3$—$(CH_2)_3$—NH—$(CH_2)_2$—OH;
pentanolamine, hexanolamine, cyclohexanolamine, polyalkanolamines or polyalkoxyglycolamines, with formula:

OH—$(CH_2$—$CH_2$—O—$)_n$—$CH_2$—$CH_2$—$NH_2$;
(n between 1 and 30);

and aminated polyols such as:

diethanolamine: $(OH$—$CH_2$—$CH_2$—$)_2$—NH;
diisopropanolamine: $(CH_3$—CH(OH)—$CH_2)_2$—NH; or
trihydroxymethylaminomethane: $((HO)H_2C$—$)_3C$—$NH_2$.

The compounds of the invention can be synthesized by reacting an excess of amino alcohol, preferably diethanolamine, with a polymerized vegetable oil, preferably polymerized linseed oil. Preferably, the reaction is carried out in the absence of a solvent and generally at a temperature of more than about 100° C., preferably in the range 100° C. to 200° C. However, if the viscosity of the reaction medium is too high, the reaction can be carried out in the presence of a solvent.

Secondly, the emulsion-breaking agent (or emulsion-breaker) can consist of at least a mixture of alkyl esters (for example C1 to C8) of fatty acids derived from natural, plant or animal oils. In this case, any oil is suitable, but preferably rapeseed oil is used, preferably the methyl esters thereof.

Clearly, the emulsion-breaking agent can be constituted by varying proportions of:

(a) at least one non-ionic amphiphilic composition obtained by reacting at least one polymerized vegetable oil with at least one amino alcohol; and (b) at least one mixture of alkyl esters of fatty acids derived from a natural oil, for example of vegetable origin.

The wetting agent that is optionally present in the organic-based formulations of the invention is more particularly selected from anionic surfactants, still more particularly a sodium dialkyl sulfosuccinate, for example sodium dioctyl sulfosuccinate.

The solvent (or diluent) that is optionally present in the formulations of the invention can be any organic base. More particularly, it can be selected from petroleum cuts (such as kerosenes), alcohols and hydro-alcoholic mixtures. It can also be selected from alkyl esters of long chain carboxylic acids, such as 2-ethylhexyl esters of a carboxylic acid cut containing 8 to 10 carbon atoms, hereinafter designated 2-ethylhexylC8C10. It can also be selected from plant derivatives such as alkyl esters (for example C1 to C8) of fatty acids derived from vegetable oils, for example methyl esters of rapeseed oil. In the emulsion-breaking formulations of the invention, the alkyl ester compositions (for example C1 to C8) of fatty acids derived from vegetable oils can thus act as a constituent of the emulsion-breaking agent proper or as a solvent (or diluent).

The proportion of solvent (or diluent) in the formulations of the invention is preferably in the range 20% to 40% by weight.

The base in which the composition defined above is used is generally a mineral oil or an oil of vegetable origin, preferably a non-polluting oil. Examples of oils of vegetable origin that can be cited are mixtures of alkyl esters (for example C1 to C8) of vegetable oils, such as mixtures of methyl esters of rapeseed oil.

The organic base used can be an oil that is identical to that of the mud. In this case, a mineral oil can be used, for example HDF2000® or EDC 95® (sold by Total Solvent), or a vegetable oil, such as BDMF® oil (a mixture of methyl esters of rapeseed oil sold by Oléon).

In a variation, the organic base as defined above can itself act as a solvent (or diluent) for the constituents (emulsion-breaking agent and/or wetting agent) of the formulations of the invention.

The invention also concerns the use of emulsion-breaking formulations as described above for the treatment of well bores drilled in oil-base mud.

In this application, the treatment formulations of the invention are selected to correlate with the mud formulation so as to be compatible with the emulsification systems and wetting agents generally used to disperse solids in the mud. The emulsion-breaking formulations of the invention satisfy selection criteria that can be checked by carrying out the following determinations:

characterization of the cake destructurizing action: in a crystallizer and in a static filtration cell using differential scanning calorimetry (DSC) and cryomicroscopy;

compatibility with formation fluids (oil and brine), treatment fluids (emulsion-breaking formulation in oil base) and drilling fluids (filtrate from oil-base drilling mud): study of emulsion formation in situ.

The aptitude of an emulsion-breaking formulation for use in accordance with the invention is principally verified by DSC. This technique is described in detail in "Utilisation de la DSC pour la caracterisation de la stabilité des émulsions eau dans pétrole" ["Use of DSC to characterize the stability of water-in-oil emulsions"] (C. Dalmazzone, H. Séris—Revue de l'Institut Français du Pétrole, vol. 53, no4, 1998). The technique is carried out using cake samples before and after treatment to evaluate emulsion-breakage in the cake.

DSC, a thermal technique, is generally used to determine the composition of water-in-oil emulsions, as it can distinguish free water from emulsified water (free water crystallizes at much higher temperatures than water droplets in an emulsion). This technique is based on the solidification and melting properties of droplets and of the medium in which they are dispersed. The data obtained concern:

the type of emulsion: simple (water-in-oil or oil-in-water) or multiple (water-in-oil-in-water or oil-in-water-in-oil);

the quantity of liquid and its state: bound or dispersed or free;

the compositions of the free and dispersed forms;

the mean diameter of the droplets and their evolution with time due to coalescence or Ostwald ripening; and matter transfers between droplets due to their compositional differences.

The conditions to be satisfied for the emulsion-breaking system are:

compatibility of the oil-base mud filtrate, the reservoir fluids and the treatment fluid. The proportion of each phase is varied to be able determine the formation of emulsions in the form of a ternary diagram. Emulsion formation is characterized by "Bottle test" type tests;

the destructurizing of cakes obtained using API emulsion-breaking tests. Cake destructurizing is evaluated by analyzing DSC curves and by cryomicroscopy.

The present invention also concerns a gravel pack carrier fluid. H. K. L. Ladva et al.(SPE 68959 "SPE Formation Damage", May 2001) recently showed that it is possible to simultaneously treat the filtration cake and drop gravel pack equipment into a well. The aim is to have a fluid that is perfectly compatible with the formulation of the mud used to drill the reservoir, but also compatible with the reservoir fluids (brine/oil), to avoid the risk of emulsion formation, which would block the reservoir. The treatment must be capable of being effective in a time period such that it can allow equipment to be dropped, but without the well starting to leak by rapid destruction of the filtration cake.

In this variation of the invention, the fluid can also contain 1% to 10% by weight with respect to the organic base of at least one viscosifying agent for the organic medium and a quantity, determined depending on the specific density required for the fluid, of at least one weighting agent.

The viscosifying agent can be selected from organo-soluble acrylic resins, which are cross-linked to a greater or lesser extent. An example that can be cited is Pliolite DF 01®, sold by Goodyear Speciality Chemicals.

The weighting agent can be selected from calcium carbonates with different grain sizes. Mikhart® products, marketed by BAROID, can be cited in this respect. For example, Mikhart 5® and Mikhart 40® respectively present grain sizes corresponding to a $D_{50}$ of 5 or 40 µm (micrometers).

It is also possible to add up to 5%, preferably up to 2% by weight with respect to the organic base of at least one dispersing agent. This can be selected from hydroxy-functionalized carboxylic acid esters the functional groups of which have affinities with the pigments used for paint formulations. An example that can be cited is Disperbyk-108® manufactured and sold by BYK-Chemie GmbH.

This variation of the invention can generally be applied to any well phase that requires a fluid having the same density as the mud used to drill the well bore.

EXAMPLES

The following examples illustrate the invention without limiting its scope.

In a first series of examples, four formulations in accordance with the invention were used.

Formulation 1: Methyl esters of pure rapeseed oil.

Formulation 2: Non-ionic amphiphilic composition obtained by reacting polymerized linseed oil with diethanolamine, 50% by weight in a mixture of methyl esters of rapeseed oil.

Formulation 3: Non-ionic amphiphilic composition obtained by reacting polymerized linseed oil with diethanolamine, 50% by weight in a mixture of equal weights of a mixture of methyl esters of rapeseed oil and 2-ethylhexylC8C10. This formulation thus contained 50% by weight of pure emulsion-breaking agent and, in total, 50% by weight of solvents. It was used in solution in 2-ethylhexylC8C10 in a concentration of 10 g/l.

Formulation 4: The formulation had the following composition:
  emulsion-breaking agent: 5% by weight of non-ionic amphiphilic composition obtained by reacting polymerized linseed oil with diethanolamine;
  wetting agent: 25% by weight of Aerosol OTS® (70% by weight of sodium dioctyl sulfosuccinate in a petroleum cut) and 20% by weight of Celanol DOS® (65% by weight of sodium dioctyl sulfosuccinate in a hydroalcoholic mixture; and diluent: 50% by weight of Ketrul 210® (deodorized kerosene cut).

Thus, this formulation contained 5% by weight of pure emulsion-breaking agent, 30.5% by weight of pure wetting agent and in all, 64.5% by weight of solvents. It was used in solution in oil at a concentration of 10 g/l, the ensemble being in solution at 1 g/100 ml in a HDF 2000® mineral oil (mud based oil) with a specific density of 0.81.

Tests on Formulations 1 to 4

Three types of tests could be carried out to evaluate the efficiency of treatment on destructurizing oil-base mud cakes: a crystallizer destructurizing test, a static cell filtration test and a test for compatibility between reservoir fluids, the formation fluids and the treatment fluid.

Crystallizer Cake Destructurizing Test

The kinetic aspects of cake destructurizing were studied using a commercial oil-base mud formulation.

Principle:

The oil-base mud was filtered through filter paper in a static filtration cell using the API procedure at a temperature of 80° C. and at a pressure difference of 3.5 MPa over one hour. The pieces of cake obtained were placed in crystallizers in contact with 20 ml of treatment solution for varying times at ambient temperature. Emulsion-breaking in the cake was evaluated using DSC.

The pieces of filter paper supporting the cake were cut up using a scalpel. The mass of the samples was about 10 mg, but weighed accurately. The sample was placed in an aluminum capsule using tweezers. Particular care was taken when manipulating the sample (cutting up the filter paper, introduction into capsule) to avoid mechanical damage to the cake.

The cell was introduced into the furnace of the DSC next to an empty reference cell. The cell then underwent a cooling-heating cycle from 20° C. to −120° C. The heat flow Q (in W/g) was recorded as a function of temperature T (in °C.). It was calibrated initially with a cell containing brine with the same $CaCl_2$ concentration as the mud. The presence of water in the sample was detected by the brine crystallization peaks.

Qualitatively, the temperature corresponding to the peaks enabled the state of the water in the sample to be determined, free water crystallizing at higher temperatures than emulsified water. Further, the shape of the peak enabled the nature of the cake to be determined, whether polydisperse (irregular peak or exhibiting a shoulder) or monodisperse (regular, sharp peak), providing information regarding its stability.

From a quantitative viewpoint, the position of the peaks enabled the fineness of the emulsion to be determined (the lower the crystallisation temperature, the smaller the droplet diameter). Further, the size of the peaks measured the mass of water present in the sample.

TABLE 1

Mud system used

BAROID 80-20 ® formulation

| | |
|---|---|
| Base oil | HDF 2000 ® mineral oil |
| Brine | Water, 24% by weight of $CaCl_2$ |

Static Filtration Test

Mud formulation A (BAROID) was filtered using the API procedure (API standard 13) at a temperature of 80° C. and at a pressure difference of 3.5 MPa. After filtering 300 ml of mud over one hour, the cell was depressurized, emptied of mud, rinsed with 200 ml of treatment solution, then refilled with 300 ml of the treatment solution. The cake inside the cell was left in contact with the treatment solution for varying time periods at 1 MPa and at 80° C. (soaking time) before filtering again.

Compatibility Test

With the aim of avoiding additional damage to the formation at the wall, the formation or otherwise of in situ emulsions was checked by selecting a treatment fluid that was compatible with the reservoir fluids (brine and oil) and the mud filtrate.

In this test, brine (NaCl, 20 g/l) was brought into contact with an organic phase composed of reservoir oil, mud filtrate and emulsion-breaking agent.

The filtrate is reconstituted from base oil and mud surfactants. The following were brought into contact, in equal volumes: a mixture composed of 80 ml of filtrate—20 ml of emulsion (3 ml of NaCl 20 g/l brine in 17 ml of reservoir oil) and 100 ml of treatment product. It was manually stirred (1 minute) and poured into a decanting flask.

The results obtained with each of the test formulations will now be described.

Example 1

Figure 1:
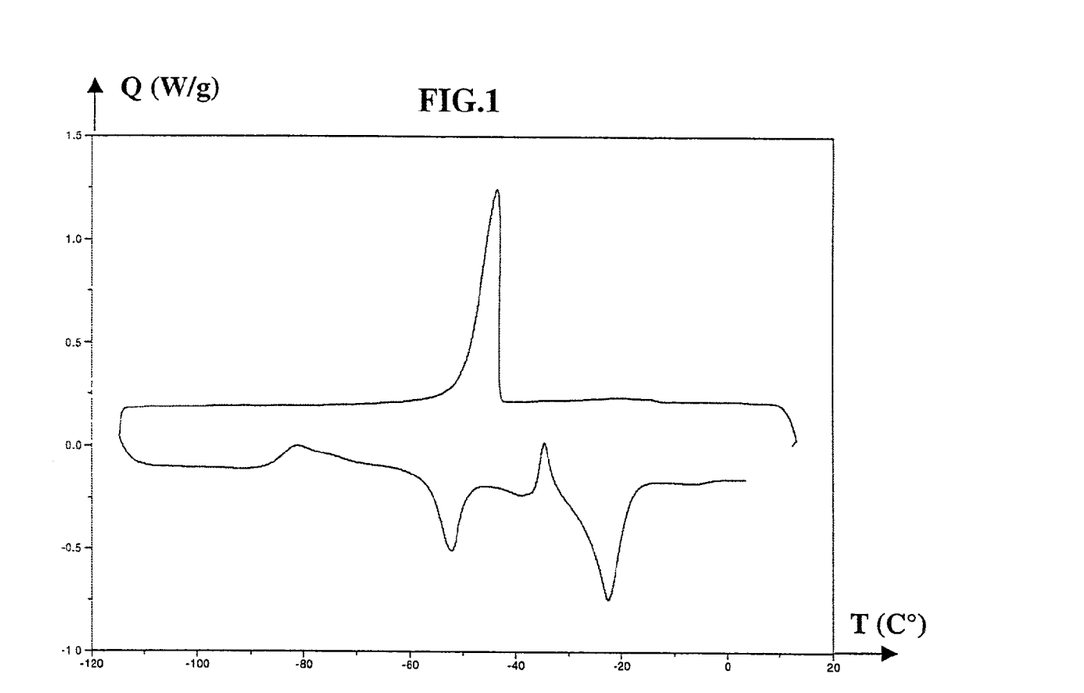
FIGS. 1 to 8 and 10 represent diagrams for determining destructurization of cakes treated with Formulations 1 to 5 described in the examples in a crystallizer, using the DSC (differential scanning calorimetry) technique for different contact times.
Figure 2:
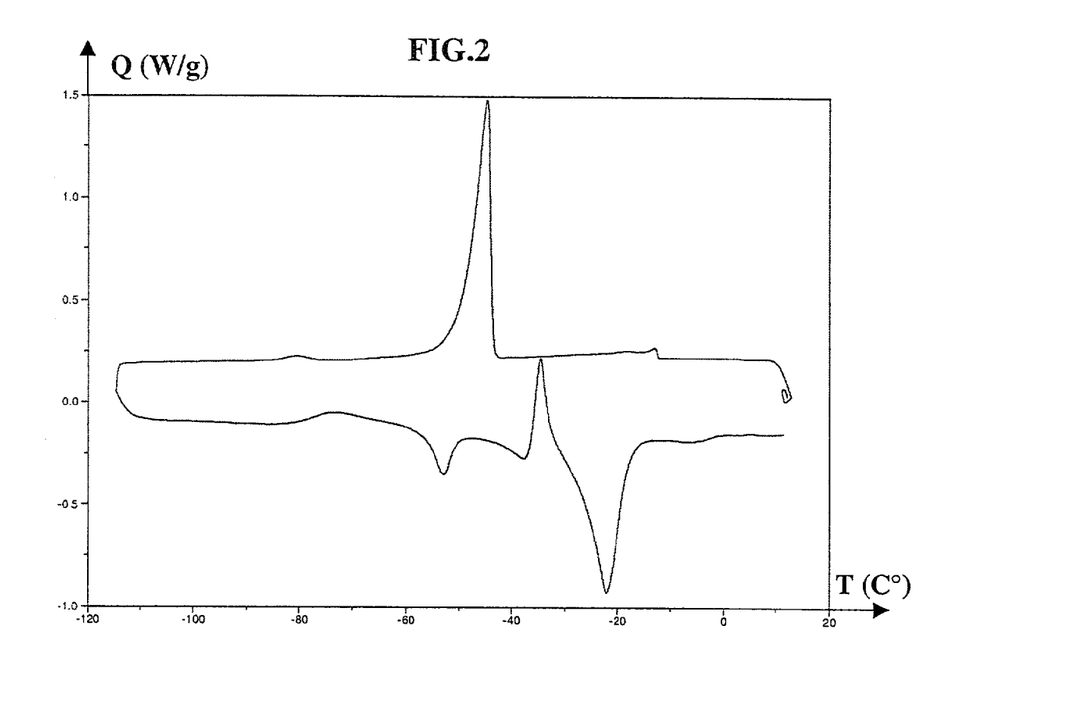

The crystallizer destructurizing test was carried out with Formulation 1. Emulsion-breaking was total after 24 hours contact time, shown by the appearance of a free water peak at about −40° C. (see FIG. 1, for 24 hours, and FIG. 2 for one week).

Example 2

Crystallizer Tests

Figure 3:
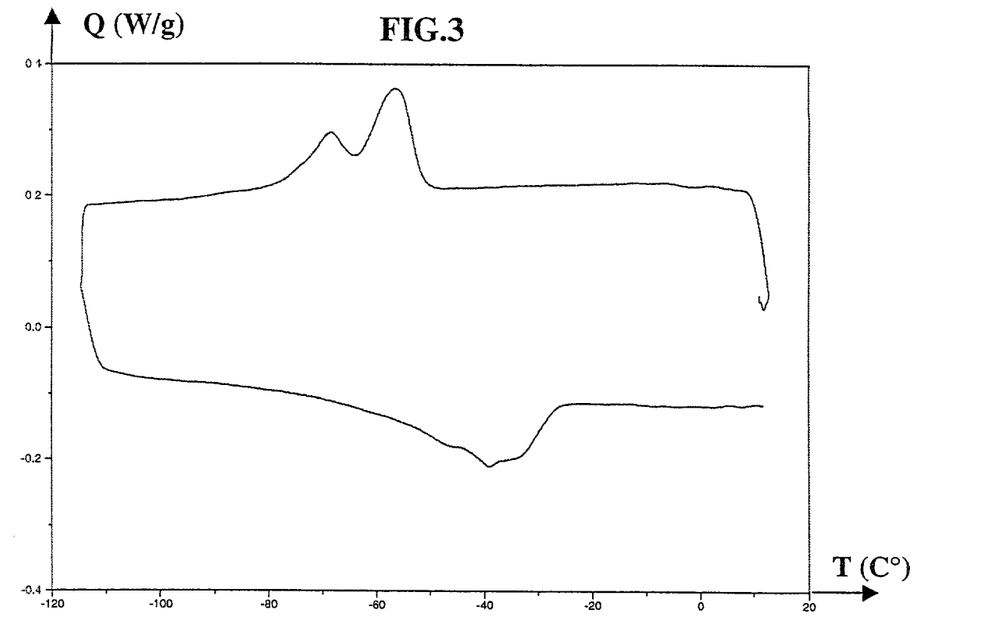
Figure 4:
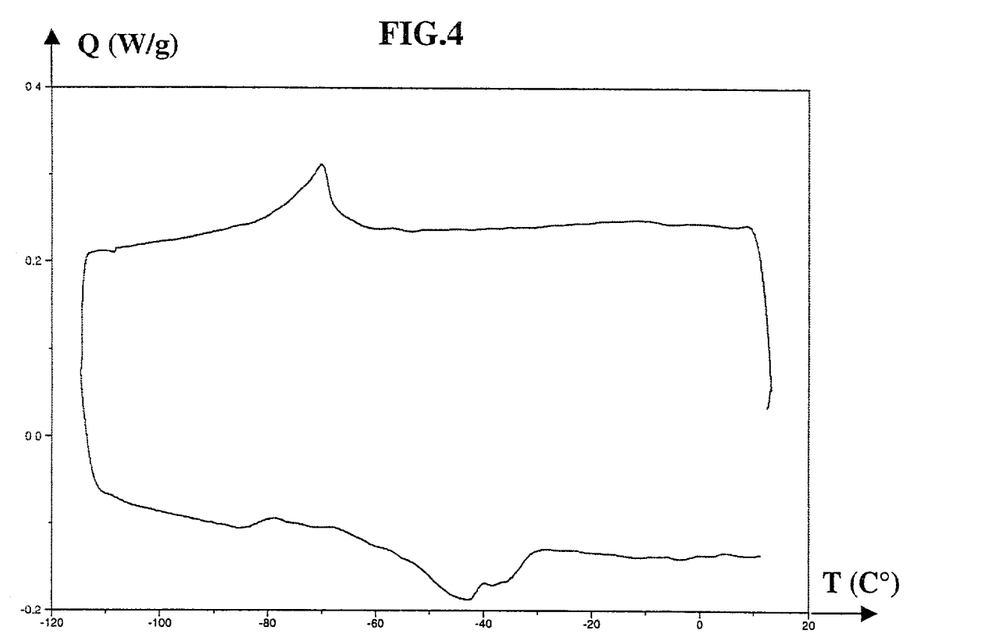

Qualitatively, at ambient temperature, even at low contact times (24 hours), a clear change in the quality of the emulsion in the cake was observed. The initial emulsified water peak (−80° C.) disappeared. Two conjoint peaks were observed at −69° C. and −57° C. This increase in the temperature indicated a larger droplet size, and coalescence of the droplets in the cake. Further, the emulsion appeared to be polydisperse (presence of two droplet sizes) (see FIG. 3). After contact for one week, the cake had been considerably destructurized (see FIG. 4).

Example 3

Figure 5:
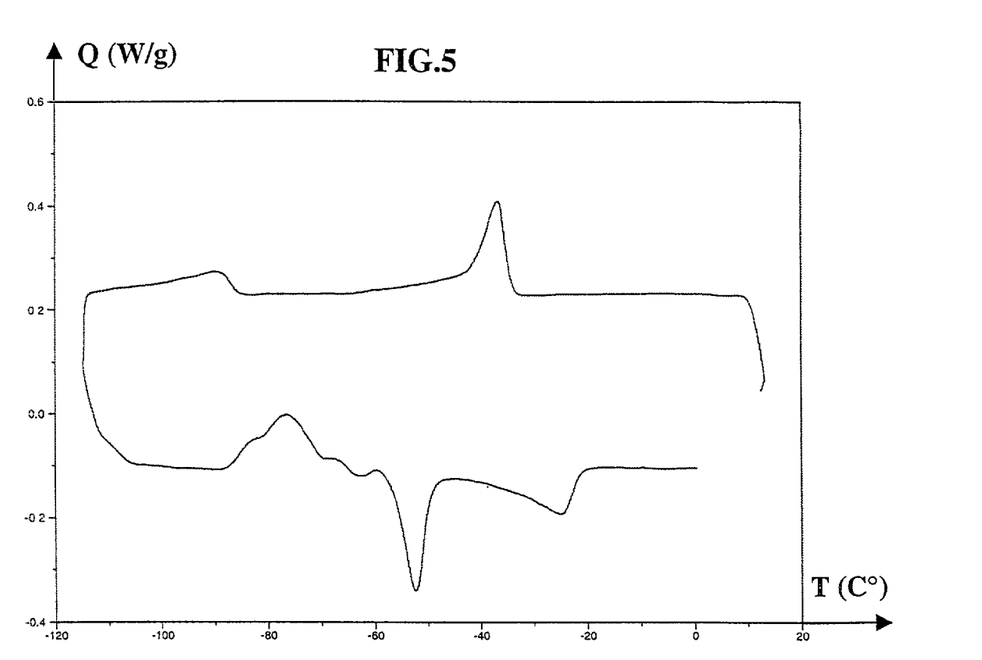
Figure 6:
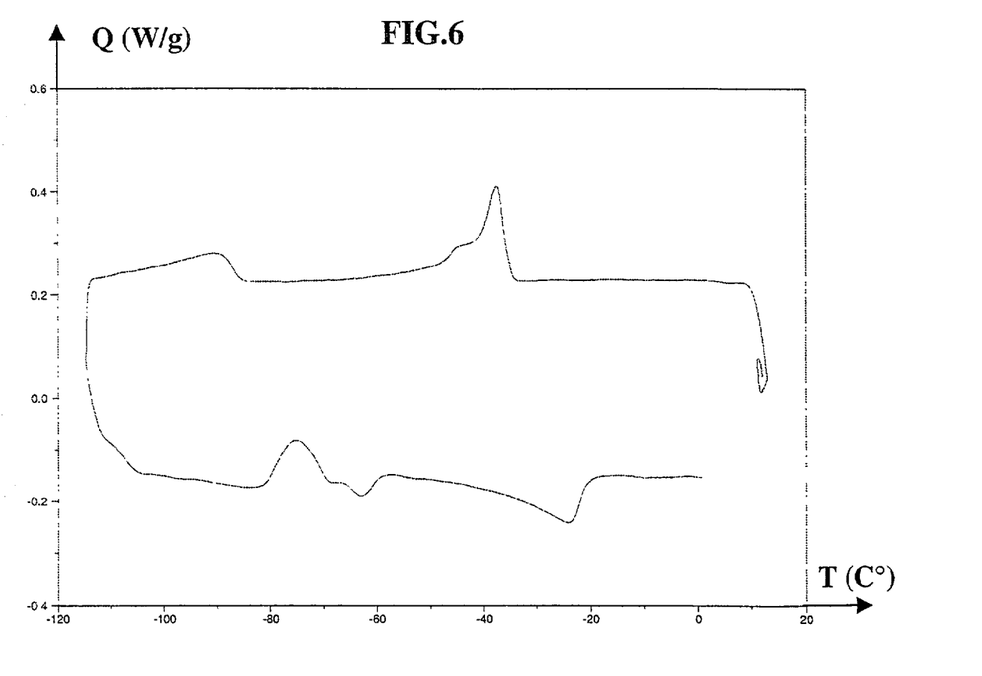

Like Formulation 2, Formulation 3 produced very rapid emulsion-breaking in the cake, observed using the crystallizer test (24 hours contact and one week's contact): the emulsified water peak had been displaced to −40° C., indicating the presence of very large droplets that could coalesce to form free water (see FIG. 5 and FIG. 6).

Example 4

Crystallizer Tests

Figure 7:
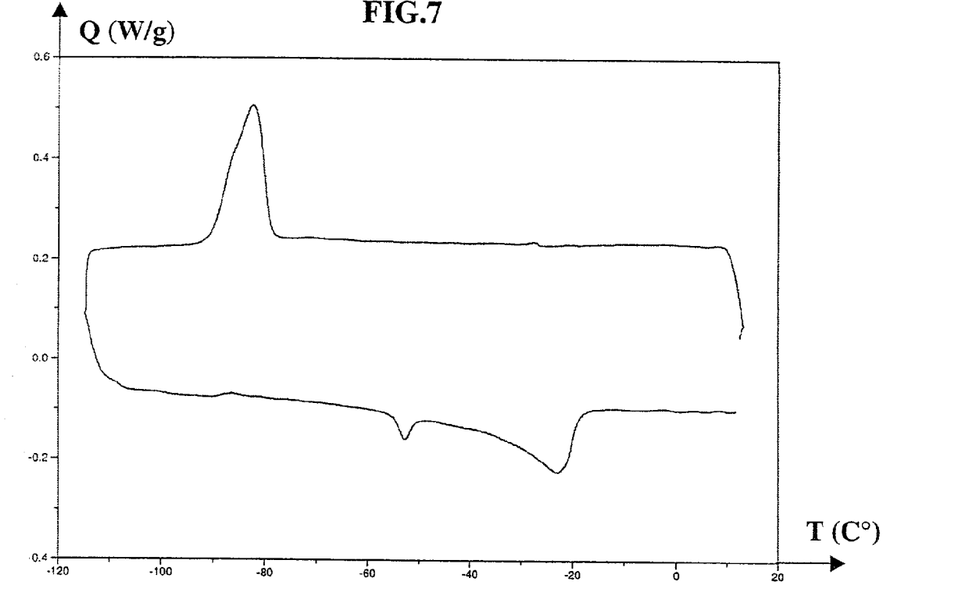
Figure 8:
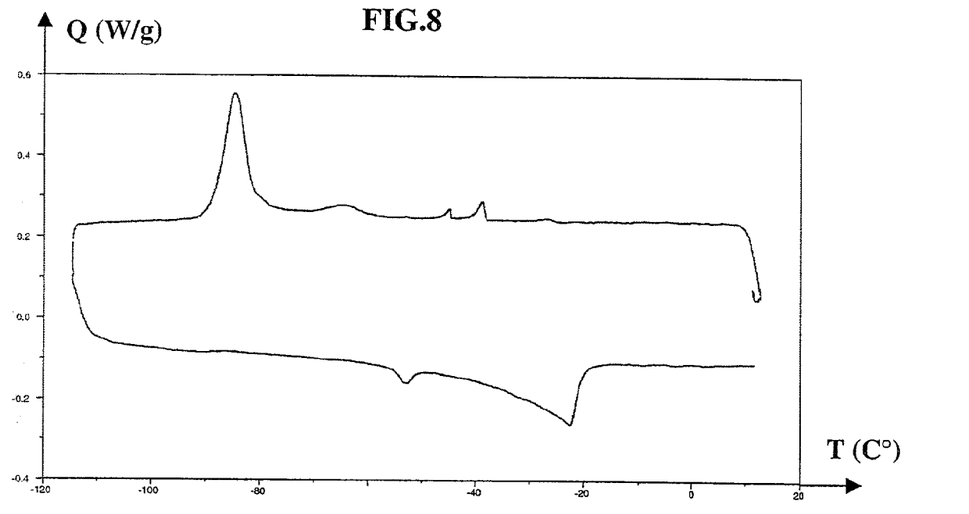

A sample of cake treated using Formulation 4 was analyzed using DSC as described above. Emulsion-breaking in the cake was confirmed by the cooling-heating cycle obtained using DSC. For a contact time of 24 h, a bulge was observed in the emulsified water peak: the emulsion became polydisperse (see FIG. 7). For a contact time of one week, different peaks were observed in the crystallisation curve: emulsified water in the form of very fine droplets was demonstrated by the peak at −80° C., while a bulge at about −60° C. indicated the presence of fine droplets in the course of coalescence. The two small pointed peaks respectively revealed the presence of large droplets of free water liberated by the breaking emulsion (see FIG. 8).

Static Filtration Tests

Figure 9:
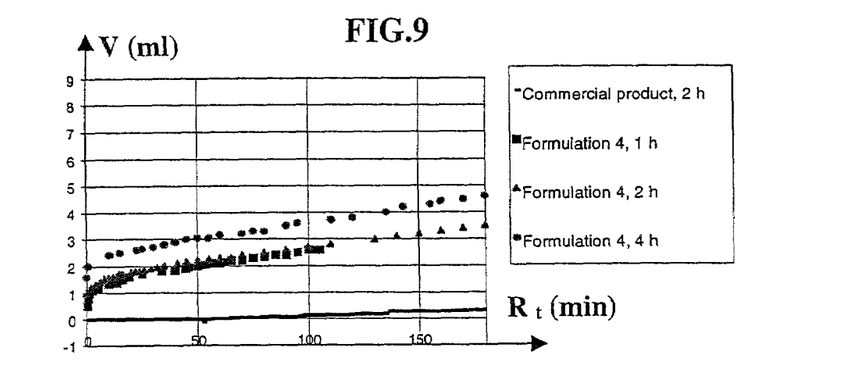
FIG. 9 shows, for a static filtration test, a graph of the variation in volume V in ml as a function of the square root of the time in minutes ($R_t$) for a commercially available product and for Formulation 4 described in the examples.

FIG. 9 shows the volume V in ml as a function of the square root of the time in minutes ($R_t$) for different contact times before filtering (1 h, 2 h and 4 h).

Comparative Example 5

The same type of test was carried out using a treatment product containing 6% by weight of a commercial product, DM1® (provided by BAROID) in solution in 64% by weight of base oil HDF 2000® and 30% by weight of an aromatic solvent, PARAGON®. The results shown in FIG. 9 by the drainage curve as a function of time show a lower filtration slope than for the formulations of the invention.

Figure 10:
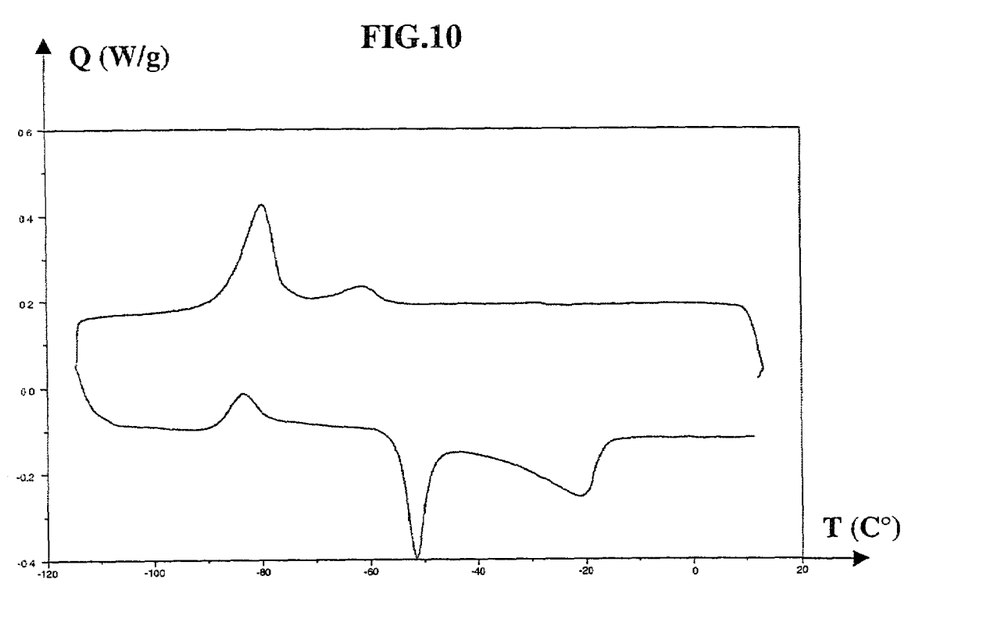

FIG. 10 shows the DSC curve of a cake treated by static filtration after a contact time of 2 hours: cake destructurizing was revealed by the coalescence of droplets in the emulsion (displacement of the crystallization peak to higher temperatures).

Compatibility Test

Equal volumes of the mud formulation and the treatment solution were brought into contact using the protocol described above. Immediate breaking of the emulsion formed was observed.

In a second series of examples, the formulations described below were used.

Formulations 5 and 6:

Formulations 5 and 6 were produced from Formulation 4 as follows:

base mixture: 10 g/l of fluid in accordance with Formulation 4 in mineral oil HDF 2000®;

while stirring using a Silverson at 6000 rpm, 5% by weight of Pliolite DF 01® was added. The mixture was allowed to mature for 16 h at 80° C.;

it was stirred for 15 min using the Silverson, at 6000 rpm;

then, while stirring for 5 minutes using the Silverson, 0.5% by weight of Disperbyk 108® was added;

to obtain a specific density of 1.12, 600 g/l of calcium carbonate was added with two different grain sizes:

in the first case, calcium carbonate Mikhart 5® (with a grain size corresponding to a $D_{50}$ of 5 μm) was used; and in the second case, a 50/50 mixture of two calcium carbonates Mikhart 5® and Mikhart 40® (with a grain size respectively corresponding to a $D_{50}$ of 5 μm and 40 μm) was used;

in both cases, it was stirred for 15 minutes using the Silverson. It was allowed to mature for 16 hours at 80° C.; finally, it was homogenized for 5 minutes using the Silverson.

The mixtures obtained had the properties indicated in the following table:

TABLE 2

| | MIKHART 5 | | MIKHART 5 and 40 (50/50) | |
|---|---|---|---|---|
| | 25° C. | 50° C. | 25° C. | 50° C. |
| Gel 0/10 (lb/100 ft²) | 12/13 | 13/14 | 10/11 | 10/11 |
| Gel 1 h (lb/100 ft²) | — | 15 | — | — |
| AV (mPa · s) | 34 | 23 | 21 | 18 |
| PV (mPa · s) | 28 | 17 | 18 | 15 |
| YV (lb/100 ft²) | 12 | 12 | 6 | 6 |

Gel 0, epressed in lb/100 ft², was obtained at a shearing gradient of 5 s⁻¹ after 30 seconds of shearing at 1020 s⁻¹ and 10 seconds rest. Gel 10, expressed in lb/100 ft², was obtained after measuring Gel 0 at a shearing rate of 5s⁻¹ after 10 minutes rest; the fifference in the two values is a characteristic of the thixotropic nature of the mixture; Gel 1h, expressed in lb/100 ft², was obtained after measuring Gel 0 at a shearing rate of 5 s⁻¹ after 1 hour;

The apparent viscosity (AV) is the viscosity corresponding to a shear of 1020 s⁻¹. The plastic viscosity (PV) is the slope of the curve that represents the shear strain as a function of the rate of shear. The threshold value (YV, yield value) is the limiting shear strain or minimum force to cause flow.

Example 6

Tests on Formulations 5 and 6

Filtration Through Berea Sandstone Section:

The core was constituted by Berea sandstone, with a length of 60 mm and a diameter of 32.7 mm. The porous medium (the core) was placed under conditions close to those of the reservoir. The core was saturated with NaCl/KCl brine, then with oil to obtain non-reducible water saturation, as follows:

(a) Saturating rock with brine: the core was placed in a dessicator under vacuum then placed under 2 MPa of pressure and run through with brine (40 g/l NaCl, 5 g/l KCl) at 10 cm³/h for 48 h with 1 MPa of pore pressure;

(b) Measurement of brine permeability: the core was traversed by the brine at different flow rates (Q: 300, 200, 100 cm³/h) and the pressure difference (ΔP) was measured between the ends of the porous medium The slope of the curve Q=f(ΔP) enabled the permeability of the rock to brine, Kw, to be calculated (in milliDarcys).

(c) Measurement of oil permeability: injection of SOLTROL® oil (refined oil, viscosity 0.7 mPa·s. at 80° C.) at 10 cm³/h for 24 h, then progressive increase of flow rate from 100 cm³/h to 500 cm³/h. The volume of water recovered enabled the degree of oil saturation (So) and water saturation (Sw) to be calculated.

(d) The core was then traversed by oil at different flow rates (300, 200, 100 cm³/g) and the pressure difference ΔP was measured. The slope of the curve Q=f(ΔP) enabled the permeability of the rock to oil, Ko, to be calculated (in milliDarcys).

The mud described above was brought into contact at a shear rate of 600 rpm with a ΔP of 3.5 MPa, at 28° C. Filtration was halted when ⅔ of the porous medium had been invaded by the filtrate. The treatment product (Formulation 4 or the weighted Formulation 6) was brought into contact for 16 hours with no ΔP, then filtration with the treatment product was carried out with the same shear rate with a ΔP of 1 MPa, at 28° C.

Figure 11:
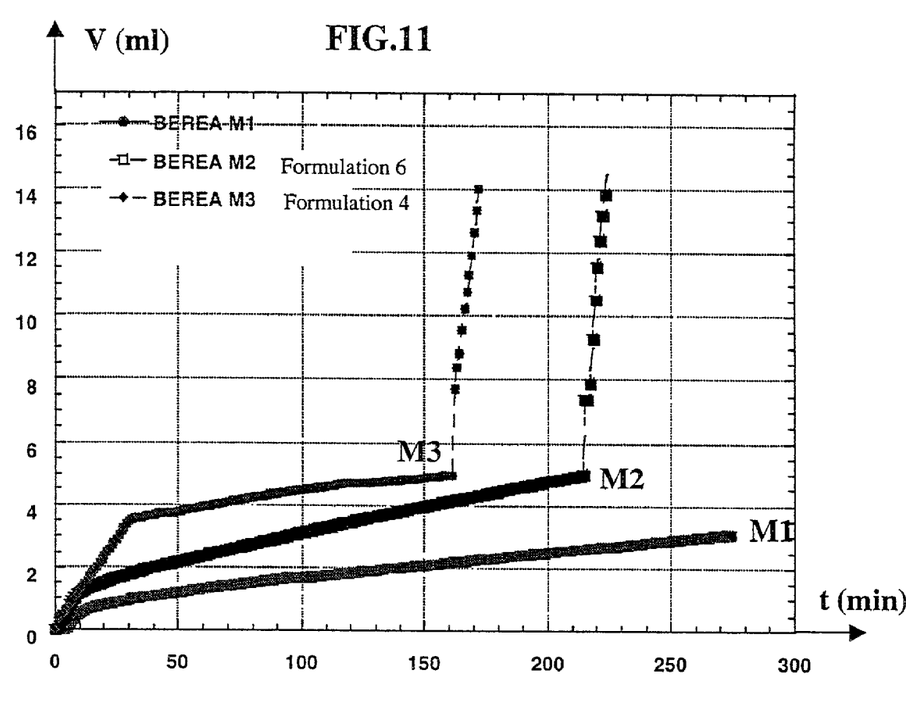
FIG. 11 shows a graph of the variation in filtered volume as a function of time, in a static filtration test on rock carried out with Formulations 4 and 5 described in the examples.

The results are shown in FIG. 11, on which the curves respectively correspond to the tests carried out without treatment product, then with Formulation 4 and the weighted Formulation 6. The break in the filtration slope at points M2 and M3 indicates destructurizing of the filtration cake. Whether or not the formulation was weighted, the filtration slopes were entirely similar, indicating breakage of the cake by the test formulation.

Characterization of Destructurization by Cryomicroscopy (Scanning Electron Microscope)

The technique used was described in the article by L. Loeber (revue IFP, 51, no 6, 1996). Samples of rock invaded with mud then brought into contact with treatment products defined above: Formulations 5 and 6, were sliced then frozen in nitrogen at −210° C. and transferred to a scanning electron microscope (Oxford CT 1500) under vacuum. The photographs shown in FIGS. 12 and 13 demonstrate that, whether weighted or not, the treatment formulation induced coalescence of the emulsion and cake destructurization.

Figure 12:
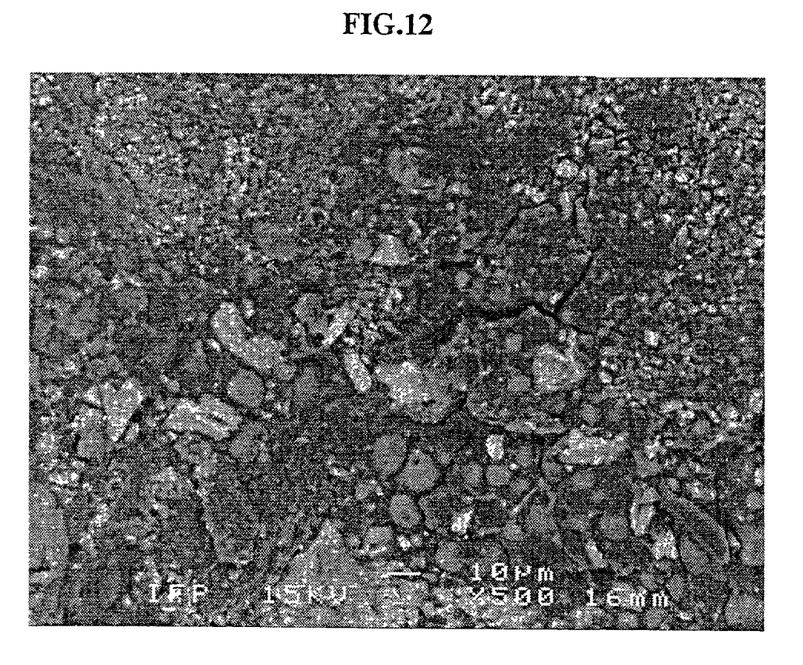
FIGS. 12 and 13 are photographs taken using scanning electron cryomicroscopy showing the destructurizing of a cake by the formulations (weighted and non weighted) of the invention.
Figure 13:
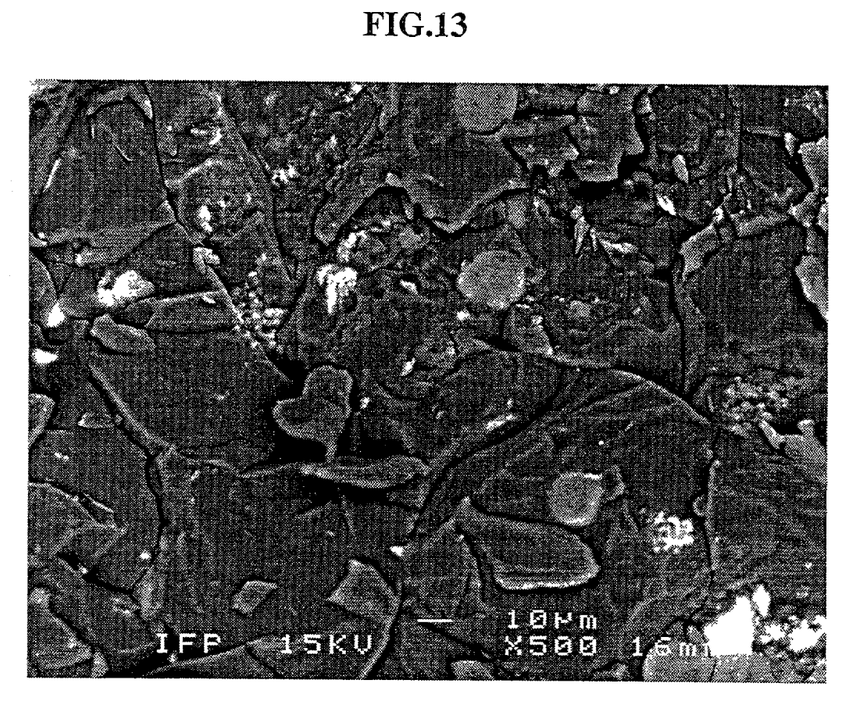

FIG. 12 corresponds to Formulation 5 (weighted) and FIG. 13 corresponds to Formulation 4 (not weighted).

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications cited above and below, and of corresponding French application 00/15198, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An organic emulsion-breaking formulation, comprising a mixture of a mineral oil as an organic base and:
   as an emulsion-breaking agent at least one non-ionic amphiphilic composition obtained by reacting polymerized linseed oil with diethanolamine,
   at least one wetting agent selected from anionic surfactants;
   and optionally, at least one solvent.

2. An organic emulsion-breaking formulation, comprising a mixture of a mineral oil as an organic base and:
   as an emulsion-breaking agent, at least one constituent selected from the group consisting of (A) at least one non-ionic amphiphilic compositions obtained by reacting at least one polymerized vegetable oil with at least one amino-alcohol, and (B) at least one alkyl ester of fatty acids derived from natural, vegetable or animal oils;
   at least one weighting agent;
   at least one wetting agent selected from anionic surfactants; and optionally, at least one solvent, wherein said wetting agent comprises a sodium dialkyl sulfosuccinate.

3. An organic emulsion-breaking formulation comprising a mixture of a mineral oil as an organic base and
   as an emulsion-breaking agent at least a mixture of methyl esters of rapeseed oil, and
   at least one wetting agent selected from anionic surfactants,
   and at least one solvent wherein
   said emulsion-breaking agent, calculated as diluent-free, is present in a proportion of 0.5% to less than 100% by weight of said formulation; and
   said wetting agent, calculated as diluent-free, is present in a proportion of up to 50% by weight of said formulation;
   said solvent is present and in a proportion of up to 99.5% by weight of said formulation; the formulation having a concentration of diluent-free emulsion-breaking agent and diluent-free wetting agent of 0.01 to 50 g per 100 ml of said organic base.

4. A process for the treatment of a well bore drilled in an oil-base mud, wherein emulsions are formable, comprising the step of adding to the well bore an emulsion-breaking formulation comprising a mixture of a mineral oil as an organic base which is an oil identical to that of the mud, and:
   as an emulsion-breaking agent, at least one constituent selected from the group consisting of (A) at least one non-ionic amphiphilic compositions obtained by reacting at least one polymerized vegetable oil with at least one amino-alcohol, and (B) at least one alkyl ester of fatty acids derived from natural, vegetable or animal oils; said emulsion-breaking agent, calculated as diluent-free, is present in a proportion of 0.5% to less than 100% by weight of said formulation; and
   at least one wetting agent selected from anionic surfactants,
   said wetting agent, calculated as diluent-free, is present in a proportion of up to 50% by weight of said formulation; and
   at least one solvent in a proportion of up to 99.5% by weight of said formulation;
wherein the formulation has a concentration of diluent-free emulsion-breaking agent and diluent-free wetting agent of 0.01 to 50 g per 100 ml of said organic base.

5. An organic emulsion-breaking formulation, comprising a mixture of an organic base and:
   as an emulsion-breaking agent, at least one constituent selected from the group consisting of (A) non-ionic amphiphilic compositions obtained by reacting at least one polymerized vegetable oil with at least one amino-alcohol, and (B) alkyl esters of fatty acids derived from natural, vegetable or animal oils, said emulsion-breaking formulation further comprising 1% to 10% by weight with respect to the organic base of at least one viscosifying agent for the organic medium and a quantity, determined according to the specific density required for the fluid, of at least one weighting agent, said viscosifying agent comprising at least one crosslinked organosoluble acrylic resin.

6. An organic emulsion-breaking formulation, comprising a mixture of an organic base comprising a mineral oil and:
   as an emulsion-breaking agent, at least one constituent selected from the group consisting of (A) non-ionic amphiphilic compositions obtained by reacting at least one polymerized vegetable oil with at least one amino-alcohol, and (B) alkyl esters of fatty acids derived from natural, vegetable or animal oils, further comprising 1% to 10% by weight with respect to the organic base of at least one viscosifying agent for the organic medium, and a quantity, determined according to the specific density required for the fluid, of at least one weighting agent wherein said weighting agent comprising a mass of particulate calcium carbonate.

7. A formulation according to claim 5, further comprising up to 5% by weight with respect to the organic base, of at least one dispersing agent.

8. A formulation according to claim 7, wherein said dispersing agent is selected from hydroxy-functionalized carboxylic acid esters the functional groups of which have affinities with paint pigments.

9. In any step of drilling or treating a well that requires a fluid having the same density as the mud used to drill the well bore, the step of adding an emulsion-breaking formulation in an organic base according to claim 5.

10. A method of breaking an emulsion comprising adding to the emulsion an organic emulsion-breaking formulation, comprising a mixture of a mineral oil as an organic base and:
as an emulsion-breaking agent, at least one constituent selected from the group consisting of (A) at least one non-ionic amphiphilic compositions obtained by reacting at least one polymerized vegetable oil with at least one amino-alcohol, and (B) at least one alkyl ester of fatty acids derived from natural, vegetable or animal oils;
at least one wetting agent selected from anionic surfactants; and optionally, at least one solvent.

11. A formulation according to claim 7, comprising up to 2% by weight of said at least one dispersing agent.

12. An organic emulsion-breaking formulation, comprising a mixture of an organic base and:
as an emulsion-breaking agent, at least one constituent selected from the group consisting of (A) non-ionic amphiphilic compositions obtained by reacting at least one polymerized vegetable oil with at least one amino-alcohol, and (B) alkyl esters of fatty acids derived from natural, vegetable or animal oils, further comprising 1% to 10% by weight with respect to the organic base of at least one viscosifying agent for the organic medium and a quantity, determined according to the specific density required for the fluid, of at least one weighting agent, further comprising an anionic wetting agent comprising a sodium dialkyl sulfosuccinate.

13. In the treatment of a well bore drilled in an oil-base mud, the step of adding an emulsion-breaking formulation in an organic base according to claim 2.

14. A method of breaking an emulsion produced in the treatment of a well bore drilled in an oil-based mud comprising adding to the emulsion an organic emulsion-breaking formulation comprising a mixture of a mineral oil as an organic base and
as an emulsion-breaking agent: at least one member selected from the group consisting of (A) non-ionic amphiphilic compositions obtained by reacting at least one polymerized vegetable oil with at least one amino-alcohol, and (B) alkyl esters of fatty acids derived from natural, vegetable or animal oils;
optionally, at least one wetting agent selected from anionic surfactants; and optionally, at least one solvent.

15. A method according to claim 10, conducted in the treatment of a well bore drilled in an oil-based mud.

16. A method according to claim 15, requiring a fluid having the same density as the mud used to drill the well bore.

17. A process according to claim 15, wherein the organic base of said formulation is an oil identical to that of the mud.

18. A formulation according to claim 12, wherein the organic base is a mineral oil.

19. A method of breaking an emulsion comprising adding to the emulsion an organic emulsion-breaking formulation comprising a mixture of an organic base and
as an emulsion-breaking agent: at least one member selected from the group consisting of (A) non-ionic amphiphilic compositions obtained by reacting at least one polymerized vegetable oil with at least one amino-alcohol, and (B) alkyl esters of fatty acids derived from natural, vegetable or animal oils;
at least one wetting agent selected from anionic surfactants;
and optionally, at least one solvent.

20. A composition comprising at least one anionic surfactant and at least one non-ionic amphiphilic composition obtained by reacting at least one polymerized vegetable oil comprising polymerized linseed oil with at least one amino-alcohol comprising diethanolamine.

* * * * *

UNITED STATES PATENT AND TRADEMARK OFFICE
CERTIFICATE OF CORRECTION

PATENT NO. : 7,226,896 B2 Page 1 of 1
APPLICATION NO. : 09/989199
DATED : June 5, 2007
INVENTOR(S) : Claire Giard-Blanchard It is certified that error appears in the above-identified patent and that said Letters Patent is hereby corrected as shown below:

Column 13, line 42 claim 13, reads "according to claim 2." should read -- according to claim 12. --
Column 14, line 21 claim 18, reads "according to claim 12," should read -- according to claim 5, --

Signed and Sealed this

Fourth Day of March, 2008

JON W. DUDAS
*Director of the United States Patent and Trademark Office*